United States Patent [19]

Steiner

[11] Patent Number: 4,763,921
[45] Date of Patent: Aug. 16, 1988

[54] COMPOUND AXLE ASSEMBLY

[75] Inventor: Helmut Steiner, Wiehl, Fed. Rep. of Germany

[73] Assignee: Bergische Achsenfabrik Fr. Kotz & Söhne, Wiehl, Fed. Rep. of Germany

[21] Appl. No.: 48,007

[22] Filed: May 8, 1987

[30] Foreign Application Priority Data

May 10, 1986 [DE] Fed. Rep. of Germany ....... 3615773

[51] Int. Cl.⁴ .............................................. B60G 5/04
[52] U.S. Cl. ..................... 280/682; 267/262
[58] Field of Search ............... 280/682; 267/260, 262, 267/269

[56] References Cited

U.S. PATENT DOCUMENTS

| 3,123,377 | 3/1964 | Hutchens | 280/682 |
| 3,767,222 | 10/1973 | Willetts | 280/682 |
| 3,799,562 | 3/1974 | Hinchliff | 280/682 |
| 3,833,236 | 9/1974 | Davis et al. | 280/682 |
| 3,933,367 | 1/1976 | Tamas | 267/262 |

FOREIGN PATENT DOCUMENTS

| 951975 | 11/1956 | Fed. Rep. of Germany . |
| 1480019 | 7/1969 | Fed. Rep. of Germany . |
| 1555983 | 12/1969 | Fed. Rep. of Germany . |
| 7313196 | 9/1973 | Fed. Rep. of Germany . |
| 2216018 | 10/1973 | Fed. Rep. of Germany . |
| 2741250 | 3/1979 | Fed. Rep. of Germany . |
| 3151052 | 8/1983 | Fed. Rep. of Germany . |
| 197174 | 5/1923 | United Kingdom ............... 267/262 |
| 1244843 | 9/1971 | United Kingdom . |

Primary Examiner—Kenneth R. Rice
Attorney, Agent, or Firm—Becker & Becker, Inc.

[57] ABSTRACT

A compound axle assembly having two or more wheel axles for trailers, the wheel axles of which are supported by longitudinal guides and are spring-suspended by pairs of leaf type springs, the central portions of which are connected to the axle bodies. The outer ends of the leaf type springs are slidingly supported in brackets that are secured to the chassis of a vehicle. The inner facing ends of the leaf type springs are slidingly supported on a compensating arm that is pivotably mounted in a bracket secured to the vehicle chassis. In order to effect the sliding support of the leaf type springs, and to improve the damping of noise, the ends of the leaf type springs, at least on the compensating or pendulum arm, rest under initial tension against their sliding elements via pivotably mounted holders and a roller secured between the latter.

6 Claims, 2 Drawing Sheets

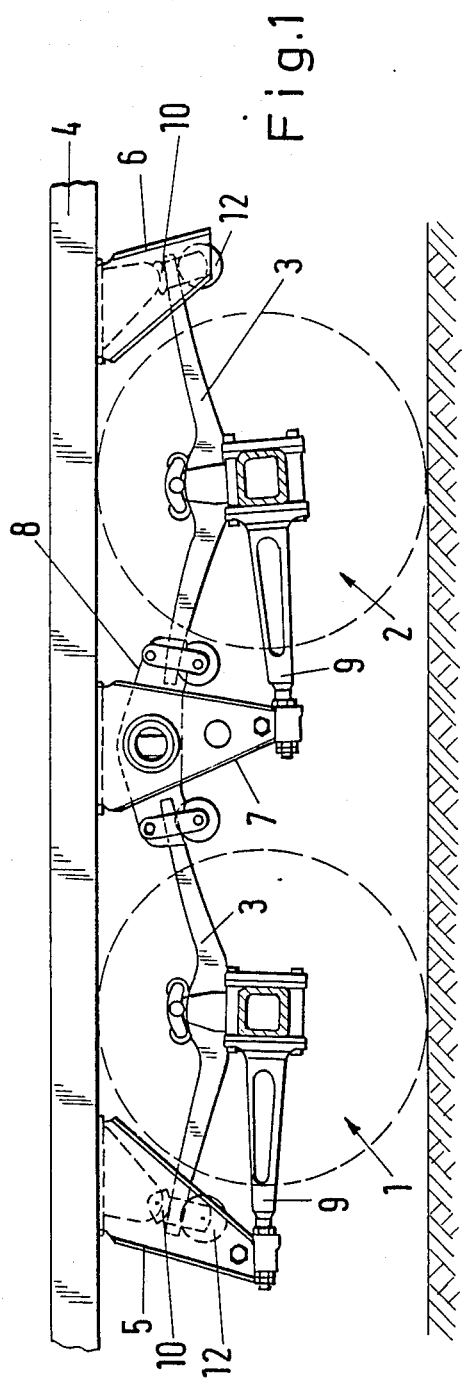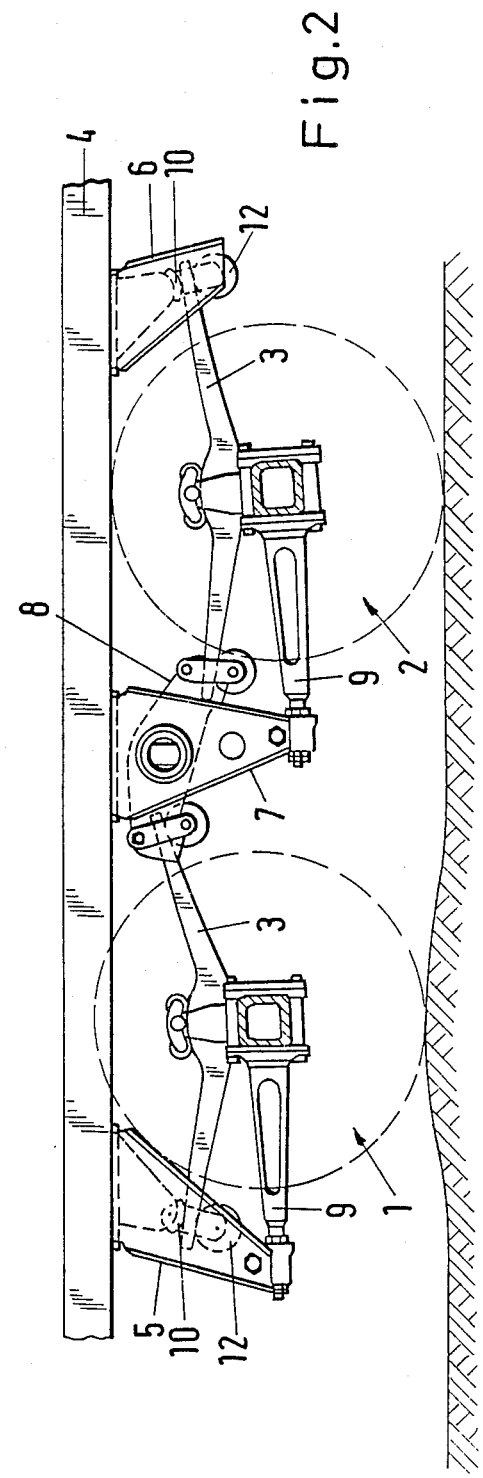

COMPOUND AXLE ASSEMBLY

BACKGROUND OF THE INVENTION

The present invention relates to a compound axle assembly having two or more wheel axles for trailers, the wheel axles of which are supported by longitudinal guide means and are spring-suspended by pairs of leaf type springs, the central portions of which are connected to the axle bodies. The respectively outer ends of the leaf type springs are slidingly supported in brackets that are secured to the chassis of a vehicle, while the facing ends of the leaf type springs are slidingly supported on a compensating arm that is pivotably mounted in a bracket secured to the vehicle chassis.

A compound axle assembly of the aforementioned general type is known from German Patent 27 41 250, Steiner dated Jan. 27, 1983, belonging to the assignee of the present invention. With this heretofore known compound axle assembly, the ends of the leaf type springs are slidingly supported in the brackets that are secured to the chassis and in the compensating arms against sliding elements, and are not anchored to their supports by formed-on eyes or the like. As a result, during driving operation the ends of the leaf type springs can lift away from their sliding elements. When these spring ends return they strike the sliding elements, producing considerable clattering noises; this occurs in particular when the vehicle is empty. In order to counteract this clattering, it was proposed in German Gebrauchsmuster 73 13 196 Sauer dated Sept. 20, 1973 to associate with each support spring an expanding spring that is clamped against the axle together with the support spring. The ends of the expanding spring press against seats in the brackets, or with compound axle assemblies in the compensating arms thereof, in order to prevent the ends of the support springs from lifting away from their sliding elements. For this purpose, it is known from German Offenlegungsschrift 31 51 052 Steiner dated Aug. 4, 1983, belonging to the assignee of the present invention, to dispose in each compensating arm a spring that presses those ends of the support springs that extend into the compensating arms against their sliding elements under initial tension.

The heretofore known springs for preventing and damping the clattering noises are very expensive. For this reason, it was already proposed in U.S. Pat. No. 3,799,562 Hinchliff dated Nov. 26, 1974 to replace the springs by less expensive rubber rollers that are secured in the brackets or compensating arms below the ends of the support springs. However, in compound axle assemblies this less expensive approach is satisfactory only in the fixed brackets, because there the relative movements between the ends of the leaf type springs and their sliding elements for the rubber rollers are relatively small. In contrast, in the compensating arms the rubber rollers are very rapidly squashed during severe deflections, and hence become incapable of functioning.

Finally, German Offenlegungsschrift 22 16 018 Wende dated Oct. 11, 1973 discloses yet another means for supporting a leaf type spring on the chassis of a commercial vehicle. Here the spring end is mounted between two support bodies, the lower one of which is a cylindrical roller, and the upper one of which is a pendulum mounted, segmented cylindrical roller member, with a portion of its curved surface resting against the upper side of the spring end. Although with this mounting the pendulum mounted support body can make rolling contact on the end of the leaf type spring, the lower cylindrical support body remains stationary and, if it is a rubber roller, can be squashed during severe deflections.

It is therefore an object of the present invention to improve the damping of noises for compound axle assemblies having slidingly supported leaf type springs.

BRIEF DESCRIPTION OF THE DRAWINGS

This object, and other objects and advantages of the present invention, will appear more clearly from the following specification in conjunction with the accompanying schematic drawings, in which:

FIG. 1 is a view that illustrates one exemplary embodiment of the inventive compound axle assembly, from the inside, on a level surface;

FIG. 2 is a view that illustrates the inventive compound axle assembly of FIG. 1 on an uneven surface;

SUMMARY OF THE INVENTION

Figure 3:
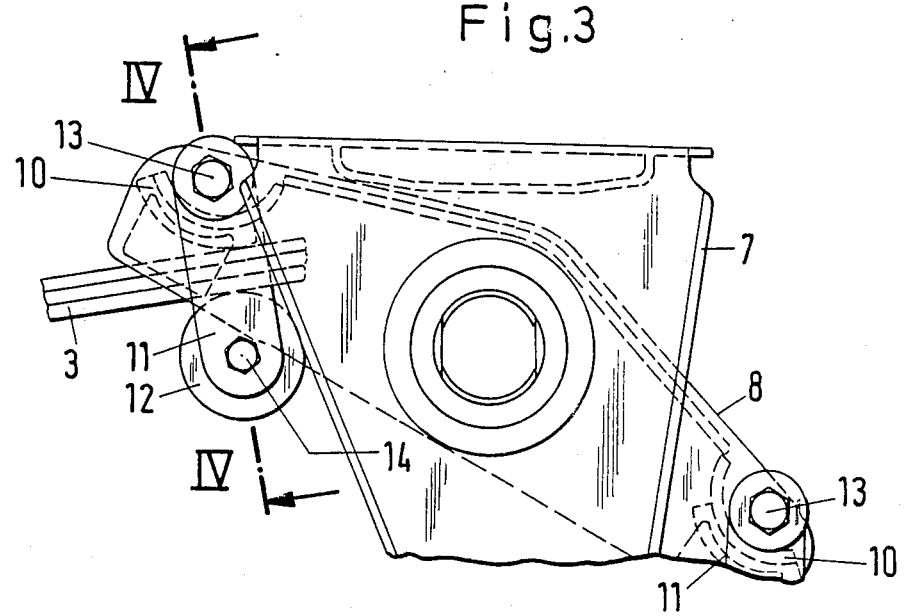
FIG. 3 is an enlarged partial view of the inventive compound axle assembly showing the compensating arm and support end suspension of a leaf type spring.
Figure 4:
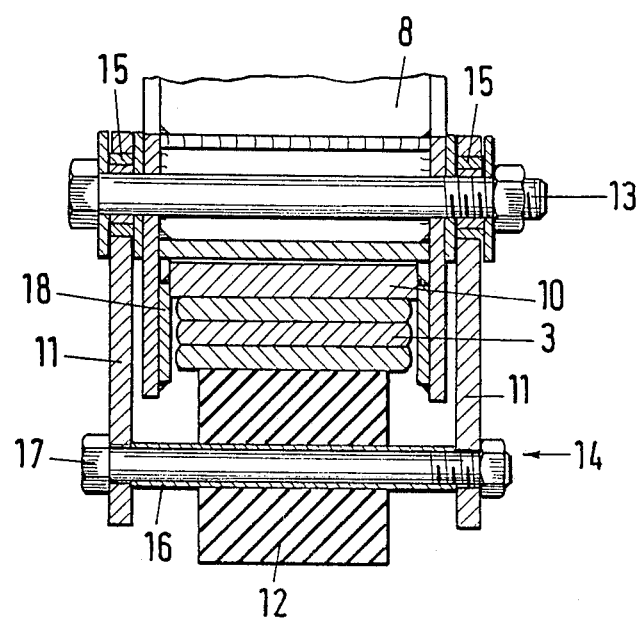
FIG. 4 is a cross-sectional view taken along the line IV—IV in FIG. 3.

The compound axle assembly of the present invention is characterized primarily in that the ends of the leaf type springs, at least on the pendulum or compensating arm, rest against their sliding elements, under initial tension, via pivotably mounted holders and a roller that is secured between the latter. In a preferred embodiment of the present invention, the pivotably mounted holders and rollers can also be disposed in the front and rear brackets that are secured to the vehicle chassis.

A compound axle assembly that is constructed pursuant to the inventive teaching has the advantage over the heretofore known measures for damping noise via additional springs or rubber rollers that the ends of the leaf type springs are constantly kept in contact with their sliding elements even during extreme deflections of the compensating arm, and especially when the vehicle is being driven in an empty condition. This constant contact on the ends of the leaf type springs with their sliding elements is achieved without in so doing having parts of the spring suspension become prematurely incapable of functioning. The reason that this is possible is that the distance between the sliding elements of the leaf type springs and the rollers in the holders in which the ends of the leaf type springs are disposed is always kept the same due to the pivotable mounting of the holders. This is due to the fact that the connecting line between the axis of rotation of the holders and the center of the rollers is always perpendicular to the longitudinal axis of the leaf type springs, regardless of what angular position the pendulum arm assumes. With such a kinematic characteristic of the leaf type spring suspension and anchoring, it is also impossible for the ends of the spring to slide out during extreme deflections of the compensating arm. The same applies for the holders which, in the preferred embodiment of the invention, are also disposed in the brackets that are secured to the vehicle. It should be noted, however, that in these brackets the angular movements between the ends of the leaf type springs and their sliding elements are considerably less.

Further specific features of the present invention will be described in detail subsequently.

DESCRIPTION OF PREFERRED EMBODIMENTS

Referring now to the drawings in detail, the illustrated compound axle assembly has a front axle 1 and a rear axle 2, with the axle beams or bodies being supported relative to a vehicle frame or chassis 4 by multilayer leaf type springs 3. These springs 3 are supported via front brackets 5, rear brackets 6, and a central bracket 7 in which are pivotably mounted compensating arms 8; the brackets 5, 6, and 7 are secured to the vehicle chassis 4. The axles 1 and 2 are each guided at the front (in the direction of travel) by two longitudinal guide means 9.

The ends of the leaf springs 3 are supported on sliding elements 10 in the brackets 5, 6 and in the compensating arm 8. So that the ends of the leaf type springs 3 cannot lift away from their sliding elements 10, these ends are held securely in position, under initial tension, via holders 11 and rollers 12. For this purpose, the holders 11 are pivotably mounted on the compensating arm 8 via pins 13, while the rollers 12 are disposed on shafts 14 at the lower, free end of the holder 11.

Whereas the holders 11 are mounted on the pin 13, which extends through the compensating arm 8, via friction bearings comprised of rings 15, the roller 12, via a spacer sleeve 16, is mounted on a pin 17 that extends through the ends of the holders 11.

During a pendulum movement of the compensating arm 8, the holders 11 can pivot relative to the latter, so that the connecting line between the pin 13 and the shaft 14 is always perpendicular to the longitudinal axis of the leaf type springs 3. In this way, the distance between the sliding elements 10 and the outer circumference of the roller 12 always remains constant, so that a twisting or a pressing-in, which would result in destruction of the roller 12, cannot occur. During a sliding movement of the ends of the leaf type spring 3 in the gap between the sliding elements 10 and the roller 12, the latter can rotate about its shaft 14. These rollers 12 can be made of a wear-resistant elastic material, such as rubber.

Welded to the inner side of the compensating arm 8 are metal wear plates 18 that face the ends of the leaf type springs 3.

In the front and rear brackets 5, 6, the ends of the leaf type springs 3 are also supported against sliding elements 10, and are held in position via rollers 12. As illustrated in FIGS. 1 and 2 in connection with the front brackets 5, the rollers 12 can also be suspended by pivotable holders in order to hold the ends of the leaf type springs 3 securely in position against the sliding elements 10 under initial tension. However, since the angular movements of the ends of the leaf type springs 3 in the front and rear brackets 5, 6 are considerably less than at the compensating arm 8, it would also be possible to mount the rollers 12 in a non-pivotable fashion, as illustrated in FIGS. 1 and 2 in connection with the rear bracket 6.

The present invention is, of course, in no way restricted to the specific disclosure of the specification and drawings, but also encompasses any modifications within the scope of the appended claims.

What I claim is:

1. A compound axle assembly, having two or more wheel axles, for a trailer, the wheel axles of which are supported by longitudinal guide means and are spring-suspended by pairs of leaf type springs, the central portions of which are connected to the axle bodies; each of said leaf type springs has two ends, including an outer end, i.e. an end remote from the outer end of the leaf type spring of an adjacent wheel axle, with this outer end being slidingly supported in a first bracket, which is secured to the chassis of a vehicle, and also including an inner end, i.e. an end facing the inner end of the leaf type spring of an adjacent wheel axle, with this inner end being slidingly supported on a compensating arm that is pivotably mounted in a second bracket, which is also secured to said vehicle chassis; said axle assembly further comprises:

holder means provided on each first bracket and on said compensating arm to provide said support for said ends of said leaf type springs, with at said holder means of said compensating arm being pivotably mounted;

respective sliding elements disposed in each of said holder means to effect said sliding support of said ends of said leaf type springs; and roller means arranged below ends of said leaf type springs and rotatably journaled as disposed at least on said holder means of said compensating arm for holding the pertaining ends of said leaf type springs prestressed always directly in contact against said sliding elements respectively under initial tension irrespective of any angular position occupied by said compensating arm that is pivotally mounted.

2. An axle assembly according to claim 1, in which also said holder means of said first brackets are pivotably mounted thereon, and in which roller means are also disposed on said holder means of said first brackets for holding the pertaining ends of said leaf type springs against their sliding elements under initial tension.

3. An axle assembly according to claim 1, which includes pins that extend through said compensating arm, with said holder means being mounted on said pins via friction bearings that are comprised of rings.

4. An axle assembly according to claim 1, which includes pins that extend through said holder means, with said roller means being rotatably mounted on said pins via spacer sleeves.

5. An axle assembly according to claim 1, in which said roller means are made of a wear-resistant elastic material.

6. An axle assembly according to claim 5, in which said wear-resistant elastic material is rubber.

* * * * *